United States Patent [19]
LaMacchia

[11] Patent Number: 6,134,379
[45] Date of Patent: Oct. 17, 2000

[54] METHOD AND APPARATUS FOR SYNCHRONIZING DEVICES IN AN AUDIO/VIDEO SYSTEM

[75] Inventor: Sam R. LaMacchia, Redwood City, Calif.

[73] Assignee: Avid Technology, Inc., Tewksbury, Mass.

[21] Appl. No.: 08/821,336

[22] Filed: Mar. 20, 1997

[51] Int. Cl.$^7$ .............................. H04N 5/928; H04N 5/76
[52] U.S. Cl. ................................ 386/54; 386/66
[58] Field of Search .................................. 386/54, 52, 57, 386/59, 61, 66, 4, 46, 100, 104, 113, 119, 96, 107; 360/70; H04N 5/928, 5/76

[56] References Cited

U.S. PATENT DOCUMENTS

| | | | |
|---|---|---|---|
| 3,787,617 | 1/1974 | Fiori | 179/100.2 |
| 4,067,049 | 1/1978 | Kelly et al. | 360/14 |
| 4,772,966 | 9/1988 | Sharples et al. | 360/71 |
| 4,937,685 | 6/1990 | Barker et al. | 360/14.1 |
| 5,467,288 | 11/1995 | Fasciano et al. | 364/514 |

FOREIGN PATENT DOCUMENTS

| | | |
|---|---|---|
| 2235815 | 3/1991 | United Kingdom . |
| 2245745 | 1/1992 | United Kingdom . |

*Primary Examiner*—Robert Chevalier
*Attorney, Agent, or Firm*—Kenneth L. Milik; Lawrence E. Monks

[57] ABSTRACT

An audio-visual editing system includes a universal slave driver (USD) coupled between a timecode-producing device, such as a video tape deck, and a digital audio workstation (DAW). The USD includes a sample counter for counting the audio samples for each timecode frame, and a timecode reader to interpret the tape's location. An audio board of the digital audio workstation includes an identical sample counter. Both counters are driven from a common clock. A serial interface connection couples the digital audio workstation to the universal slave driver. One of the handshaking pins of the serial interface connection is used as a dedicated reset pin. When the dedicated reset pin is pulsed, the running sample counters in both the USD and DAW are set to a common value, typically zero. Resetting the sample counters at precisely the same time ensures that the DAW and the USD are operating in synchronization. Once the sample counters are set to a common value, an efficient, binary protocol may be executed over the serial interface to determine the timing relationship between the sample counters and the beginning of a frame of the off-tape timecode from the videotape/audiotape recorder. The DAW need then only refer to it's own sample counter, and not to any timecode, to calculate a precise point to trigger playback.

20 Claims, 10 Drawing Sheets

METHOD AND APPARATUS FOR SYNCHRONIZING DEVICES IN AN AUDIO/VIDEO SYSTEM

FIELD OF THE INVENTION

This invention relates generally to the field of digital audio editing and more specifically to a method and apparatus for synchronizing a digital audio workstation to an external device.

BACKGROUND OF THE INVENTION

During motion picture production, a picture and its associated sounds are typically recorded either on a common medium or on separate mediums. The picture is most often recorded on film, though recording on video is increasingly common. The associated sound is typically recorded on one or more audio tracks using either analog tape machines or digital recording devices. Because the sound is typically recorded on different media than the picture, resynchronization is required during the post production phase of filming.

To facilitate the resynchronization of the sound with the picture, a reference signal is often recorded along with the sound on the audio tracks. The reference signal may include a time code, typically of the SMPTFE format. The picture is apportioned into a number of frames, with each of the frames also including a SMPTE time code for indicating a relative position of the frame within the picture. Digital audio workstations, used during post production phase, utilize the SMPTE time codes of the motion picture and the SMPTE time codes of the audio tracks to control the speed of audio playback and thereby achieve resynchronization of the image with the audio.

Only some of the original frames of the motion picture will make it into the final production. The audio tracks, associated with those frames, may be retrieved using the SMPTE time codes. In addition, the audio track is evaluated for modification and improvement. The modification and improvement may be performed at a digital audio workstation (DAW). Digital audio workstations (DAWs), used to store and manipulate digital audio data, have gained popularity in the recording studio and post-production environments. A DAW is a computer that is used to modify and improve the audio track by adding tracks, building sound effects, and cleaning up existing tracks to remove unwanted background noise. Because the audio data is recorded in the digital medium, a number of advantages are provided over linear audio tape recording. For example, recording on a hard disk instead of a linear audio tape provides instant access to any portion of the audio track. In addition, the audio track may be edited and changed without affecting the original source material.

Once the audio editing is complete, the final film may be generated by playing back the audio tracks in synchronization with the SMPTE time codes of the selected picture frames. For top picture quality, the relationship between the display of the picture at a specified time code, and the production of the associated sound at that time code must be precisely synchronized. The loss of synchronization accuracy could potentially result in the degradation of the provided output image. For example, a gunshot must be heard at the same time a muzzle flash is seen. Of course, the synchronization accuracy requirements extend beyond Foley effects. The moving mouth of the speaker must be precisely synchronized with the dialogue being spoken, and a musical sound track for a feature film must be aligned with the unfolding action on the screen. In addition, synchronization may need to be maintained between multiple, different audio channels, regardless of any associated video.

In some video systems, a video slave driver such as the Digidesign Video Slave Driver™, is provided between the external video source device (video tape machine) and the digital audio workstation (DAW). The video slave driver is used to provide clocking and positional information to the DAW. The positional information allows the DAW to initiate playback of audio at a specified frame of the video. The clock provided to the DAW maintains synchronization between audio and video. During operation, the video slave driver is first used to synchronize the frame positions of the external device and the DAW. Once synchronization between the devices is established, the slave driver maintains synchronization, and, if it detects that synchronization has been lost, reestablishes synchronization between the two devices.

One method of the prior art to synchronize, or slave, a digital audio workstation to an external machine such as a video tape recorder includes the following steps. First, a clock reference is selected at the video slave driver, where the clock reference may be either a time code, such as the longitudinal time code LTC, a house video signal, or a video reference signal such as a black burst signal. A hardware clock resolver circuit uses the clock reference as the input to generate an audio sample clock. The audio sample clock is guaranteed to be locked to the clock reference with zero long term drift.

The audio sample clock and a positional reference (where both the sample clock and the reference may be the same signal) are forwarded to the DAW. Playback at the DAW is initiated through the use of a 'trigger', where the trigger may be, for example, the positional reference of the top of a video frame. The digital audio workstation is triggered to play back at a speed (1×) exactly in synchronization with the external device using the positional reference information that was input separately or provided as a clock reference. The digital audio workstation continues to play at 1× speed, with the clock resolver ensuring no long term drift between the digital audio workstation and the clock references. During playback, the positional reference received on the video signal is compared to the playback position of the digital audio workstations. When these two drift apart synchronization is lost.

One problem with synchronizing the digital audio workstation to the video tape deck is ensuring that the digital audio workstation is triggered to begin playback at a position aligned with the top of each video frame. For example, if the digital audio workstation were to trigger at the appropriate time code but not at the same time as the start of the frame, the audio playback may be unaligned with the video playback and the output effects would be degraded.

Typically, synchronization and triggering have been maintained by the use of software commands interfacing the slave driver to the digital audio workstation. During the synchronization steps outlined above, when the digital audio workstation triggers playback, it may not be perfectly aligned with the positional reference, either as a result of a fixed or a variable error. Fixed errors may include, for example, time code reader delays, transmission delays between the slave device and the digital audio workstation, playback engine startup delays at the digital audio workstation, the time for the digital audio workstation to detect a trigger event and audio interface transit delays. Variable delays may include those delays that occur as a result of software or as a result of hardware limitations. For example, a system interrupt may have incurred a servicing delay capable of affecting the relationship between the slave device and the digital audio workstation. Variable delays are problematic for users because systems response is not predictable.

To synchronize reliably, there are several methods a workstation may use to accurately trigger its playback engine at a particular external machine frame position. These methods depend on a time code reader's capability.

For example, one method of triggering is a poll and countdown method. In the poll and countdown method, a request for current time code information is sent by the DAW to the external device in the middle of a video frame. Once the time code of a particular frame has been determined, frame edges are counted to determine the exact beginning of a future time code for triggering purposes. Typically, the workstation will poll time codes in the countdown method until within a few frames of the trigger point and then count frame edges from there.

There are a few drawbacks to the poll and countdown method. First, this method is effective if the initial request for time code information is received at the external device in the middle of the desired time code. However, if the request is sent near a frame edge, it cannot be determined with precision whether or not the time code returned by the external device to the DAW is correct. Thus this method requires some way for the DAW to determine the middle of the frame for sending time code requests. Without such a mechanism, resultant triggering will be variable from up to one frame length. A further drawback of this method is that there are limits as to how rapidly the external device may be queried to determine the beginning, middle or end of the frame. Thus the accuracy of detecting the beginning of the video frame controls the trigger accuracy. Accordingly, polling delays and interrupt latencies may affect its accuracy.

A second method of triggering is a coincidence method. The VLAN and VLX video control LANS from Video Media support a coincidence code. The digital audio workstation instructs a time code reader at the video controllers to send a coincidence character when a particular time code is reached. The workstation uses the receipt of this character to trigger a playback.

One drawback of the coincidence method is that the accuracy of receiving the coincidence character determines the trigger accuracy. Thus, serial transmission time and serial interrupt latencies may affect the receipt of the coincidence character and thus may adversely affect the trigger accuracy.

Accordingly, a general aim is to provide a new method for triggering a playback engine to a particular external machine position.

SUMMARY OF THE INVENTION

A slave driver circuit is coupled between a clock reference source and a digital audio workstation, for generating an audio sample clock resolved to the clock reference signal. The slave driver includes a sample counter, for counting cycles of the audio sample clock. The audio sample clock is forwarded to the digital audio workstation, which also includes a sample counter for counting cycles of the audio sample clock. A dedicated signal line interfaces the slave driver to the digital audio workstation, and is used for resetting the sample counters at the digital audio workstation and at the slave driver. Because the two sample counters can be accurately aligned, trigger positions may be determined by having the DAW fetch a sample count from the slave driver indicative of the number of samples between frame edges. The DAW then triggers an event when the sample count at the DAW matches the sample count fetched from the slave driver. Thus a hardware method for synchronizing the DAW to an external device is provided without the variable delays inherent in software triggering methods of the prior art.

According to one aspect of the invention, an apparatus for synchronizing a first and second device, wherein the first device and the second device both include a counter tracking a common medium, includes a signal line, coupled between the first and second devices, for carrying a signal for simultaneously resetting the counters to align the first device and the second device at identical reference points of the common medium.

According to another aspect of the invention, an audio-visual editing system includes a video reference generator, for generating a video reference signal. A video tape recorder is coupled to the video reference signal for providing a video image comprising a plurality of frames of video data, each of the frames having associated therewith a time code. The video tape recorder provides a positional reference signal corresponding to the time code of a frame of video data being processed by the video tape recorder. A clock slave driver is coupled to the video reference signal and to the positional reference signal, for providing a sample clock signal, resolved to the video reference signal, and operating at an audio sampling frequency. The clock slave driver includes a first counter controlled by the sample clock. A digital audio workstation is coupled to the sample clock signal and includes a second counter controlled by the sample clock. A signal line, coupled between the clock slave driver and the digital audio workstation allows for simultaneous reset the first and second counters. With such an arrangement, the positional reference of two external devices may be correlated without incurring variable delays presented by prior at software methods.

According to another aspect of the invention, a method for synchronizing a second device to first device, where the second device and the first device reference a common medium and the second device and first device are coupled via a slave driver, includes the step of simultaneously resetting a first counter at the first device and a second counter at the second device by pulsing a signal coupled between the first device and the second device, where the first counter represents a positional reference of the first device relative to the common medium, and wherein the second counter represents a positional reference of the second device relative to the common medium.

According to a further aspect of the invention, a method for synchronizing a digital audio workstation to a video tape deck includes the steps of generating, at a clock slave driver coupled between the video tape deck and the digital audio workstation, a sample clock resolved to a reference clock signal, the sample clock correlated to audio sample positions of an audio signal provided by the video tape deck. The clock slave driver counts assertions of the sample clock and forwards the sample clock to the digital audio workstation. The digital audio workstation also counts assertions of the sample clock. The counts at the digital audio workstation and at the clock slave driver are simultaneously reset in response to an assertion of a signal coupled between the clock slave driver and the digital audio workstation to synchronize a monitoring position of the audio signal at both the digital audio workstation and the clock slave driver.

With such an arrangement, the positional reference of two external devices may be correlated without incurring variable delays presented by prior at software methods.

DESCRIPTION OF ILLUSTRATIVE EMBODIMENTS

Figure 1:
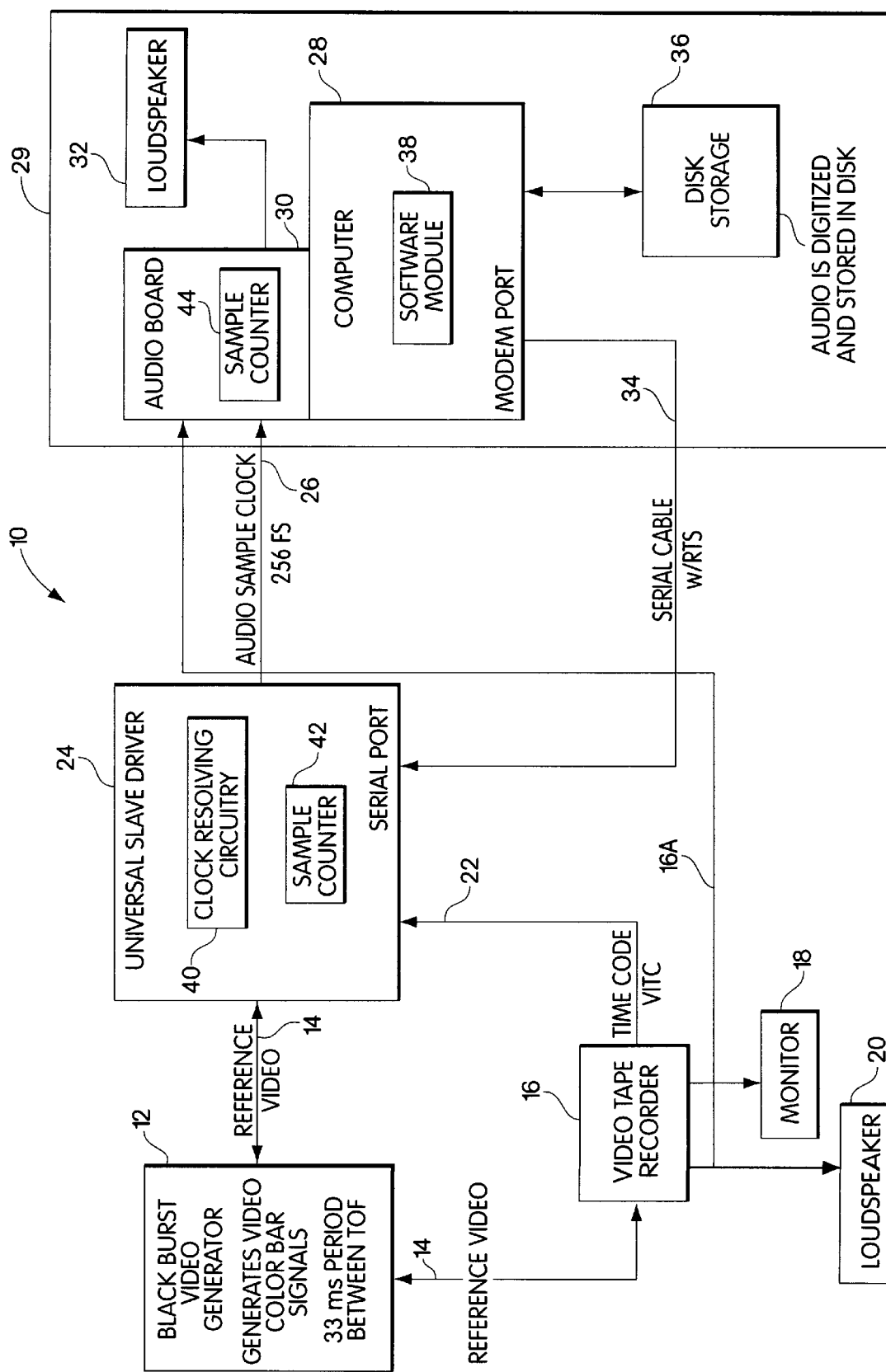
FIG. 1 is a block diagram of one embodiment of an audio-visual editing system according to the present invention.

Referring now to FIG. 1, one embodiment of an audio-visual editing system 10 for synchronized recording and playback of video and audio is shown to include a video generator 12 for providing a reference video signal 14. The reference video signal 14 may be any video signal used as a master timing reference for a studio. In one embodiment, the video reference signal is a house synchronization signal, having a frame period of 33 ms and a content that is black or color bars. Other video reference signals may include, for example, a Longitudinal Time Code (LTC), a Vertical Interleave Time Code (VITC), or a bi-phase signal.

In the embodiment of FIG. 1, where the video reference signal 14 is a house synchronization signal, the reference video signal 14 is forwarded to a video tape recorder 16. The video tape recorder 16 is used for recording and optionally the playback of a video tape having one or more audio tracks. During recording and playback the video image and accompanying audio may be monitored via loudspeaker 20 and monitor 18.

In the embodiment of FIG. 1, the audio input is stored on tape with the video input. Thus, during recording, the audio signal 16a is forwarded to a digital audio workstation 29, where an audio digital signal processing (DSP) board 30 receives the audio information, converts it to digital format and stores it in disk storage area 36. In another embodiment, the audio input may be recorded separately from the video input, and would be forwarded from an audio recorder (not shown) to the audio DSP 30.

Also recorded on the tape as an audio or video signal is a running "clock" in the form of a timecode stream. This running clock is referred to as a Society of Motion Picture and Television Engineers (SMPTE) time code, used to synchronize the playback and recording of the video image and an audio stream. There are two basic techniques used to record SMPTE time code on magnetic tape: Longitudinal Time Code (LTC) or a Vertical Interleave Time Code (VITC). The LTC is recorded as an audio signal on one of the audio tracks on the audio or video tape. VITC is recorded within the video signal in the video "blanking area" of each video frame. The video tape recorder 16 forwards the time code received during recording or playback to the universal slave driver 24.

The time code recorded contemporaneously with the audio signal is forwarded to a universal slave driver (USD) 24. The universal slave driver 24 uses the received reference video signal 14 and the time code information 22 to generate an audio sample clock 26 for controlling timing at a Digital Audio Workstation (DAW) 29. The USD also forwards a positional reference 27, in the form of a timecode value, to the computer 28 of the DAW. Using the sample clock and positional reference signals, the slave driver 24 aids in the synchronization of the DAW with an external device such as the video tape recorder.

The DAW 29 includes a host processor 28 coupled to a disk storage device 36 and an audio board 30. The DAW provides the tools for production, recording, editing and mixing of audio to provide professional-quality digital recordings. The DAW may be a digital audio workstation provided by Digidesign® of Palo Alto Calif., where the host processor may be, for example, a standard NuBus-equipped, Macintosh computer with a 68040 processor manufactured by Apple™ Computer Corporation. Software tools, stored in the memory module 38 of the host processor 28, control the recording, mixing and editing of digitized audio. An example software tool for providing the above functions is the Digidesign® Pro Tools software. Pro Tools software allows for recording of multi track digital audio directly to a hard disk while allowing other acoustic effects, such as MIDI instruments and effects, to be integrated into the audio system. The Pro Tools software provides means for recording, editing, mixing, and mastering of professional-quality audio in a single integrated system.

The audio DSP board 30 is coupled to the host processor 28 via a Small Computer System Interconnect (SCSI) interface. The audio board may be, for example, the 882 Audio Interface Board, or the 888 Audio Interface board from Digidesign®. The Audio Interface board acts as an interface between an input audio stream, the host computer, a monitor 32 and a loudspeaker 34.

The basic operation of the audio-video editing system 10 is as follows. As mentioned above, the medium that is to be recorded on (for example a video tape) is initially 'striped' with an SMPTE time code, or derivative thereof, before any other data is recorded on the medium. According to one method of operation, one of the network devices, such as the video tape recorder, is assigned to be the master and all other devices read and follow the time code read from the master. The devices synchronize to the master device by comparing their own time code stripes to the incoming time code received from the master device, and continually adjusting their own transport speed so that all devices are registering the exact same time code value at the same time.

One problem with synchronizing to external devices to a time code granularity arises because, although there is only one time code per frame of video data, the audio information for each frame is broken up into much finer divisions, called samples. For example, according to the NTSC standards, each frame may be subdivided into 1500 audio samples. Thus external devices should be triggered to initiate production at specific times such that the video display does not become unsynchronized with the sound effects provided by the audio.

The universal slave driver USD serves two functions in the networked audio visual system; providing a sample clock, resolved to an input reference, and extracting position information from an input video signal to improve the accuracy of triggering between the DAW and an external device such as a video tape recorder. The common clock source provided by the USD to the DAW is an audio sample clock, resolved to an input reference signal. The common clock is also used internally to the USD. Because the common clock is resolved to an input reference that controls the rate of production of video, any increases or decreases in the speed of the video input are reflected by the speed of the common clock.

In addition, according to one aspect of the present invention, the USD provides a method and apparatus for ensuring that the video tape recorder and the digital audio workstation trigger at the correct positions in each frame. Unlike previous triggering methods, which have the drawbacks of communication overhead and inherent variable delays, the present invention, by providing duplicate sample counters 42 and 44 in the universal slave driver (USD) 24 and at the audio interface board 30, respectively, can ensure accurate triggering at the digital audio workstation at the start of each frame as will be described in more detail below.

Figure 1A:
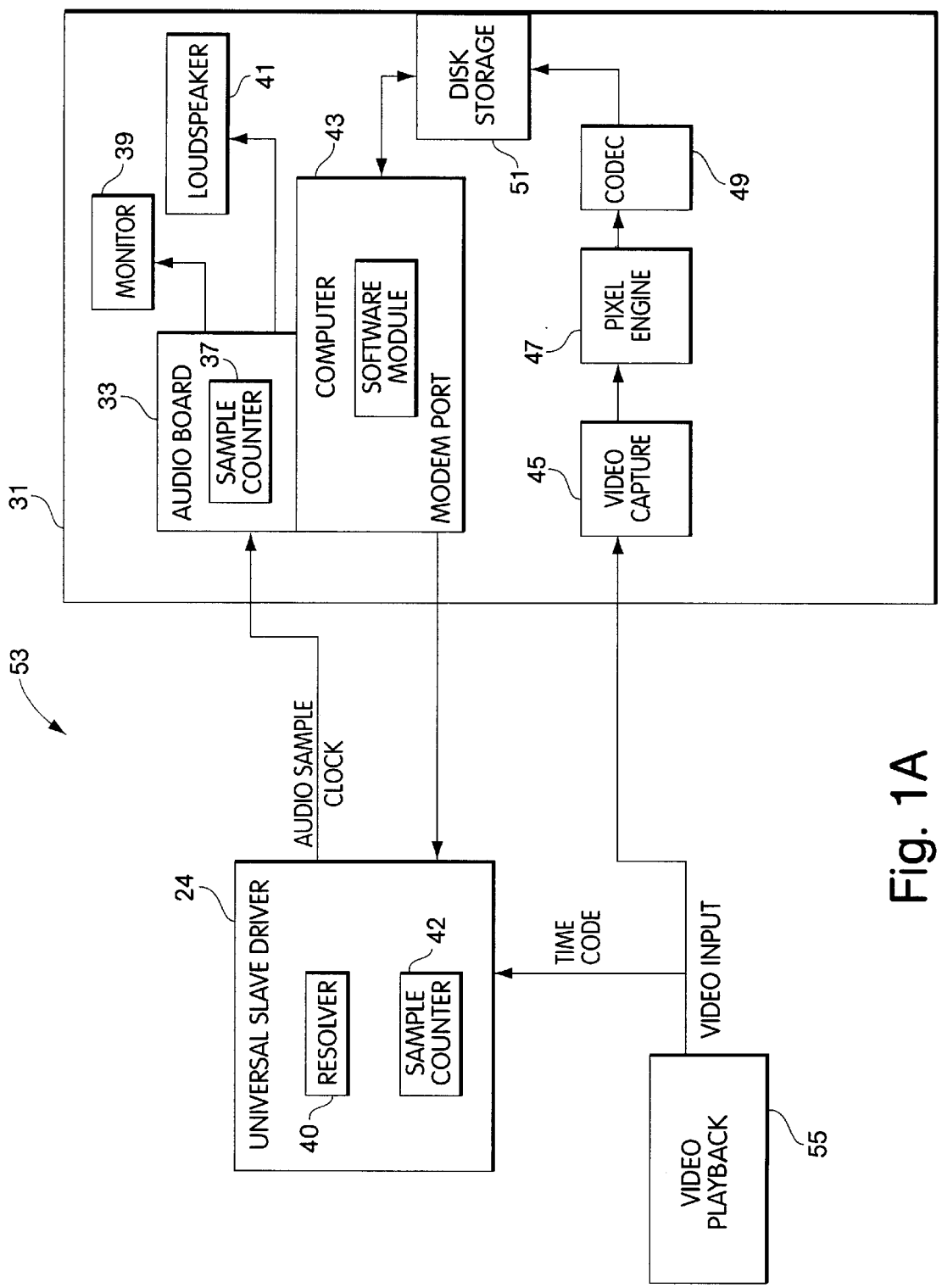
FIG. 1A is a block diagram of a second embodiment of an audio-visual editing system according to the present invention.

Referring now to FIG. 1A, a second embodiment of an audio-visual editing system 53 is shown to include a digital audio workstation 31 coupled to the universal slave driver 24. In the embodiment of FIG. 1A, the digital audio workstation 31 is an AudioVision Digital Audio Workstation manufactured by Avid® Technology, Inc. of Tewksbury Mass. The digital audio workstation 31 combines audio editing capability with the ability to immediately display images associated with the audio program. The DAW 31 provides this functionality by storing, in disk storage device 51, a digitized representation of the video. The video input is received from a video playback machine 55 in NTSC, PAL or other format, and forwarded to a video capture and frame store unit 45. The video capture and frame store unit 55 can be a NuVista unit from Truevision, for example. Digital video information is supplied through a pixel engine 47 and a compressor/decompressor (Codec) 49 for storage in disk device 51. The Codec 49 compresses and/or decompresses video data according to standard JPEG protocol.

As in the embodiment of FIG. 1, both the video and audio are stored with associated time codes, in order to facilitate later editing. During playback, problems associated with aligning the video and audio data are minimized, since a common oscillating clock is used to control each portion of the logic. As long as the audio portion was recorded in synchronization, it can be ensured that playback will occur in synchronization.

Thus, it is important in the DAW system of FIG. 1A to ensure that the audio and video frames are recorded in synchronization. For example it may be desired, during recording, to start an audio track, such as music, at a predetermined frame of the video track. The USD is used to ensure alignment between the audio tracks input to the DAW and the video input. In the embodiment of FIG. 1A, synchronization of recording is facilitated by providing a VITC time code, provided as part of the video input, to the USD. In this embodiment, the audio sample clock, generated by the USD, is resolved to the VITC input. Thus, no positional reference information need be forwarded to the DSP of the audio board 33 of the DAW 31. In this embodiment, like the embodiment of FIG. 1, both the USD 24 and the audio DSP 33 include respective sample counters 42 and 37. The sample counters are used to ensure accurate triggering at the digital audio workstation at the start of each frame as will now be described.

Figure 2:
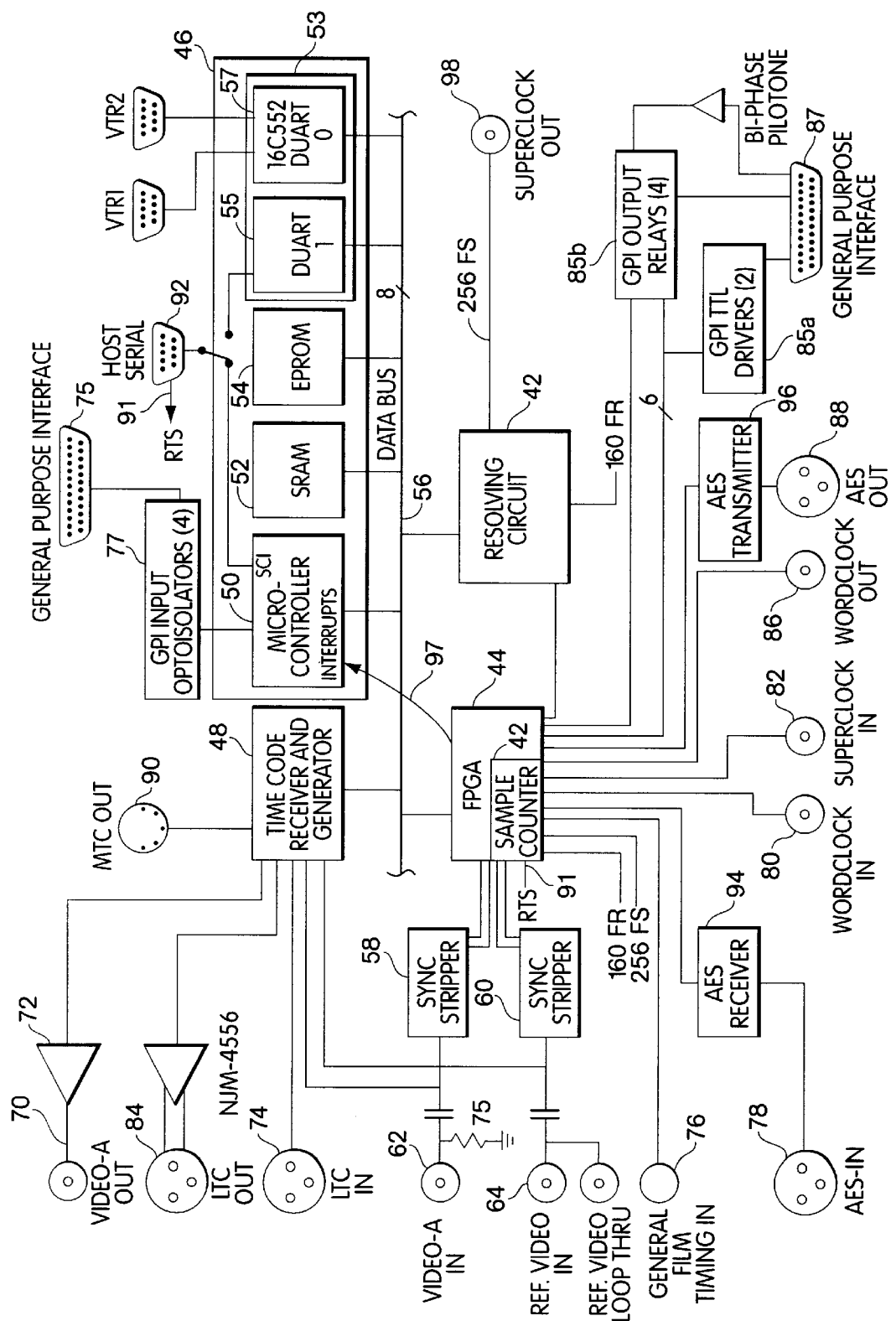
FIG. 2 is a block diagram of a universal slave driver used for providing clocking and positional information to the digital audio workstation of the audio/video editing system of FIG. 1 or FIG. 1A.

Referring now to FIG. 2, a block diagram of the universal slave driver 24 in accordance with one embodiment of the present invention is shown. One function of the universal slave driver 24 is to generate a pair of clocks, one operating at 256 times the audio sampling frequency (the 256Fs SuperClock) and one operating at 1 times the audio sampling frequency (the word clock, also known as the sample clock). These two clock are used internally within the USD, and simultaneously made available to the DAW. In one embodiment, the 256Fs frequency is 11.2896 Mhz and thus the word clock frequency is 44.1 Khz.

A second function of the universal slave driver is to provide sample count information to the DAW. This sample count information is used for triggering of the DAW as will be described in more detail below.

The universal slave driver shown in FIG. 2 includes four major functional areas including a resolving circuit 42, a field programmable gate array (FPGA) 44 which comprises the sample counter 42 of the present invention, a microcontroller subsystem 46, and a time code receiver and generator 48. These four major functional areas are coupled together by a data bus 56 of the microcontroller subsystem.

In addition to components contained within the four major functional areas described above, the USD 24 further includes two video input terminals 62 and 64 coupled respectively to two synch strippers 58 and 60. The input video signals 62 and 64 are also coupled to an input of the time code receiving and generating subsystem 48. Each of the synch strippers 58 and 60 derive high quality horizontal synchronization and vertical synchronization signals from the incoming video signals, and provide the horizontal and vertical synchronization signals to the field programmable gate array (FPGA)44 as potential resolving sources for the resolving system.

A video output terminal 70 is also connected to the time code receiver and generator 48 through an output buffer 72. The output buffer 72 provides buffering and amplification of an output video signal from the universal slave driver 24. This video output signal may be coupled, for example, to a video picture monitor, for the purpose of viewing current timecode values, as superimposed by the USD onto the incoming picture.

The universal slave driver 24 includes several other input and output terminals as shown in FIG. 2. A Longitudinal Time Code (LTC) input terminal 74 is connected to an input of the time code receiver and generator 48. An LTC output terminal 84 is connected to the FPGA 44. Also connected to the FPGA are a word clock input terminal 80, a word clock output terminal 86, a sample clock input terminal 82, a general film timing input 76 and AES input and output terminals 78 and 88. The general film timing input 66 can receive at one of various rates either a pilot tone signal, a tach signal or a bi-phase signal. The AES input terminal and output terminal are connected to the FPGA 44 through respectively an AES receiver 94 and an AES transmitter 96.

A MIDI Time Code (MTC) output terminal 90 is connected to the time code receiving and generating subsystem 48. The MIDI time code output provides positional information to an external MIDI (Musical Instrument Digital Interface) device such as a drum or rhythm machine.

A serial interface terminal 92 is connected to the microcontroller 50 to enable the microcontroller to communicate with an external processor according to a protocol of the present invention, as will described in more detail below. The serial interface terminal 92 couples the USD to a modem port of the DAW. Thus an existing port of the DAW may be used for communicating time code and setup information with the USD. An RTS pin of the serial interface, a handshaking lead typically used for modem control, is used to synchronize the sample counters in the DAW and the USD to enable the DAW to determine exact triggering locations as will be described in more detail below.

As mentioned above, the sample clock output 98 is a clock output resolved to an input clock reference signal. Although in FIG. 1 the clock reference used is a black burst video reference signal 14, it should be noted that the clock reference may alternatively be sourced by the AES, LTC, pilot tone, tach signal or bi-phase signals, depending upon the type of external device that drives the USD.

The universal slave driver 24 additionally includes a 25 pin general purpose interface (GPI) input port 75 and general purpose output port 87. A non-destructive poly-fuse is used for providing current limited power to the GPI connectors. The 25 pin connector is apportioned to provide four opto-isolated GPI inputs and six GPI outputs. Four of the GPI outputs from relay circuit 85b with isolated returns and the remaining two outputs are from TTL drivers 85a.

The operation and further description of each of the input and output signals as well as the four primary functional areas (the time code receiver and generator 48, the field programmable gate array 44, the microcontroller subsystem 46 and the resolving circuit 42) of the universal slave driver 24 is provided below.

Time Code Receiver and Generator

The time code receiver and generator 48 performs several functions related to time code reception and generation. The time code receiver and generator reads an LTC input signal received at the LTC input terminal 74 and provides an output LTC clock signal, based on the received LTC signal, to the FPGA 44. The LTC clock signal is a potential resolving source of the resolving system and is derived from a 14.31818 MHZ oscillator included within the time code receiver and generator.

The time code receiver and generator 48 also reads Vertical Interval Time Code (VITC) from a video signal received at one of the video input terminals 62 and 64 of the slave driver. The particular video input signal from which VITC is read is selectable by software in the microcontroller subsystem 46. The time code receiver and generator can read VITC from two different scan lines, can search for scan lines containing VITC, can insert VITC information on two scan lines of the outgoing video signal and can optionally insert a "burn-in" window in the output video signal, provided at the video output terminal 70, with human-readable time code.

The time code generator and receiver can also be programmed by the microcontroller 50 to provide an interrupt signal to the microcontroller subsystem through the FPGA 44 via signal line 97. The interrupt signal can be provided once per field of the input signal, once per frame and upon the detection by the time code generator and receiver of various error conditions. The time code receiver and generator 48 also converts a received time code to a MIDI Time Code (MTC) provided to the MTC output terminal 90.

In one embodiment of the present invention, the time code receiver and generator is implemented using an SMPTE time code receiver/generator chip, ICS 2008A manufactured by Integrated Circuit Systems, Inc., Valley Forge, Pa. In that embodiment, a Clock oscillator is coupled to the ICS 2008A to provide the 14.31818 MHZ clock signal.

Microcontroller Subsystem

The microcontroller subsystem 46 shown in FIG. 2, includes a microcontroller 50, a static Random Access Memory (SRAM) 52, an Erasable/Programmable Memory (EPROM) 52, and a dual UART 53, comprising UARTs 55 and 57, all coupled via an 8 bit data bus 56. The resolving circuit 42, the FPGA 44 and the time code receiver and generator 48 are connected to the microcontroller 50 over the 8 bit data bus 56.

The microcontroller 50 functions as the primary controller of the universal slave driver 24 and accesses the other components of the system over the data bus 56. The microcontroller is also coupled to the serial interface 92 for providing access between the slave driver 24 and a host computer system, such as the digital audio workstation 29. The main serial port 92 is software switchable between the microcontroller 50 and one half of the dual UART 53. The switch position is controlled by dual UART 53.

The dual UART 53 allows for the interconnection of two VTR serial ports 66 and 68 to the microcontroller subsystem. In one embodiment of the present invention, the dual UART is a 16C552 UART, the microcontroller 50 is a Toshiba MC68HC11E1 microcontroller, the SRAM 50 includes 32 k bytes of static RAM, and the EPROM 52 is a one megabit EPROM.

Resolving Circuit

The resolving circuit 42 receives a reference signal having a reference frequency and provides an output resolved signal having a frequency that is equal to the frequency of the input signal multiplied by a resolving ratio M/N.

An example embodiment of a resolving circuit for use in the present invention is described in patent application Ser. No. 08/635,234. "A Digital Audio Resolving Apparatus and Method," filed Apr. 12, 1996 by Mock and incorporated herein by reference. The resolving circuit 42 operates generally as follows. The resolving circuit 42 includes a Direct Digital Synthesis (DDS) circuit having a microprocessor and a Numerically Controlled Oscillator (NCO) to generate a digital approximation of a sine wave at the frequency of the output resolved signal. The precise frequency of the sine wave signal generated by the DDS circuit is controlled by a phase signal received from the microprocessor. An input counter and an output counter respectively count pulses of the reference signal and the output resolved signal. The processor periodically reads the output values is of each of the two counters and calculates a ratio of the number of pulses of the reference signal to the number of pulses of the output resolved signal. The ratio calculated by the processor is compared to the desired resolving ratio M/N and the difference between the calculated ratio and the desired ratio is used to generate the phase signal to control the DDS circuit to adjust the frequency of the output resolved signal to be M/N times the frequency of the input reference signal.

Field Programmable Gate Array (FPGA)

The field programmable gate array 44 is a RAM programmable device that implements substantially all of the remaining logic in the universal slave driver, including maintenance and update of the sample counter 42 for use in the present invention. The field programmable gate array is initially unprogrammed after a power on or a reset of the resolving system. Upon power on or reset, configuration data for the FPGA, stored in the EPROM 54, is loaded by the microcontroller 50 into the FPGA to provide the necessary configuration of the FPGA. Because the FPGA is configured using software, the FPGA is easily modified which allows the resolving system to adapt to new synchronization requirements without manufacturing changes.

Figure 3:
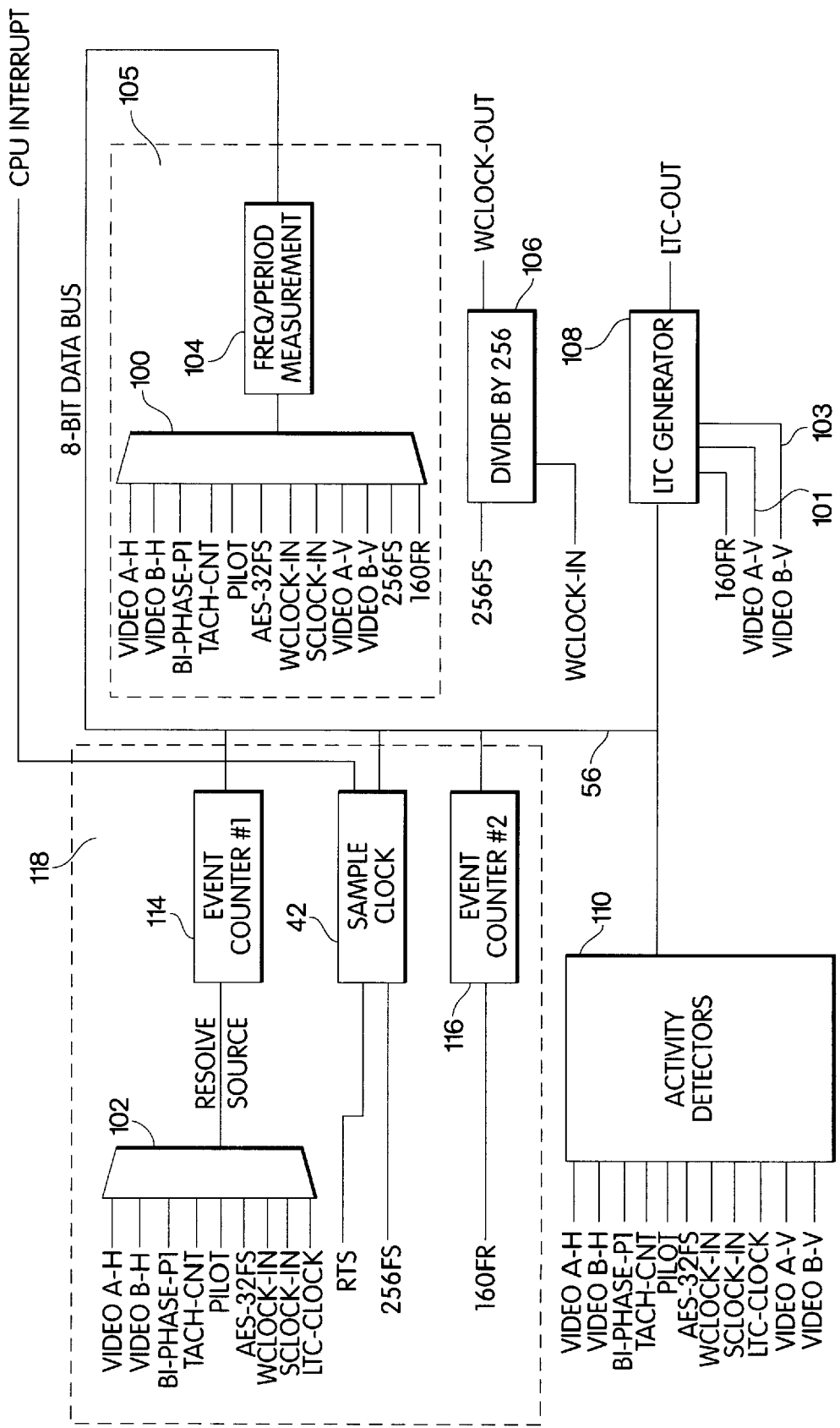
FIG. 3 is a block diagram of an FPGA logic circuit of the universal slave driver of FIG. 2.

A functional block diagram of the field programmable gate array 44 showing the primary functions of the FPGA as configured for the universal slave driver is shown in FIG. 3. The FPGA 44 includes an LTC Generator 108, an activity detector 110, a frequency/period measurement unit 105, a divide by 256 unit 106 and a resolving unit 118. The divide by 256 unit is used for dividing the Superclock 256Fs clock signal, provided by the clock resolver 48, down to a sample clock (Word Clock) signal operating at the audio sampling rate.

The LTC generator 108 provides the LTC output signal at the LTC output terminal 84 of the slave driver. The LTC generator receives the 160 Fr signal from the resolving circuit 42 and the vertical synchronization signals videoA-V 101 and videoB-V 103 generated by the sync-strippers 58 and 60 to generate the LTC output signal.

The activity detector 100 of the FPGA 44 detects the status of input signals at each of input terminals 62, 64, 78, 80, and 82 and reports the status to the microcontroller subsystem 46 over the data bus 56.

The frequency/period measurement unit 105 of the FPGA 44 includes a multiplexer 100 and a frequency/period measurement circuit 104. The multiplexer 100 selects one of several input signals for frequency or period measurement and provides the selected signal to the frequency/period measurement circuit 104. As shown in FIG. 3, the multiplexer 100 receives several signals including VideoA-H, VideoB-H, Bi-Phase-p1, Tach, Pilot, AES, WClock-In, Sclock-In, VideoA-V, VideoB-V, 256 Fs and 160 Fr. The VideoA-H, VideoB-H, VideoA-V and VideoB-V signals are the horizontal and vertical synchronization signals received by the FPGA from the synchronous strippers 58 and 60. The bi-phase, tach and pilot signals are synchronization signals that can be received at the general film timing input terminal 76. The AES signal is the input AES signal received at the AES input terminal 68 and the 256 Fs and 160 Fr signals are output signals of the resolving circuit 42. The Wclock-In signal is a word synchronization signal that is received at the Word clock-In terminal 80, Sclock-In is a sample clock signal received at input terminal 82. The frequency period/measurement circuit 104 measures the frequency and/or the period of a selected input signal, and sends a signal indicative of the measured parameter to the microcontroller 50 over the data bus 56.

The resolving unit 118 in conjunction with the resolving circuit 42 provides the functionality for resolving the sample clock output 98 to a selected input reference clock. The resolving unit 118 includes a resolving multiplexer 102, and three event counters. The resolving multiplexer 102 is used to select one of the input signals shown in FIG. 3 as the resolving or reference source of the resolving system. The first event counter is the sample counter 42 according to the present invention, used for ensuring accurate triggering of a digital audio workstation to an external device. The other two counters are event counters 114 and 116, which need not be described in detail herein.

As shown in FIG. 3, the sample counter receives, as input, the sample clock output (Word Clock) from the divide by 256 unit 106. The sample counter also receives input signal RTS, the RTS signal from the host serial port 92 (FIG. 1). During operation, the counter is always running whenever the sample clock output is generated by resolver circuit 42. The detection of the leading edge of the RTS signal at the sample counter causes the bits of the sample counter 42 to be cleared. Thus, a hardware signal, sent directly from the host interface, is used to reset the sample counter.

Figure 4:
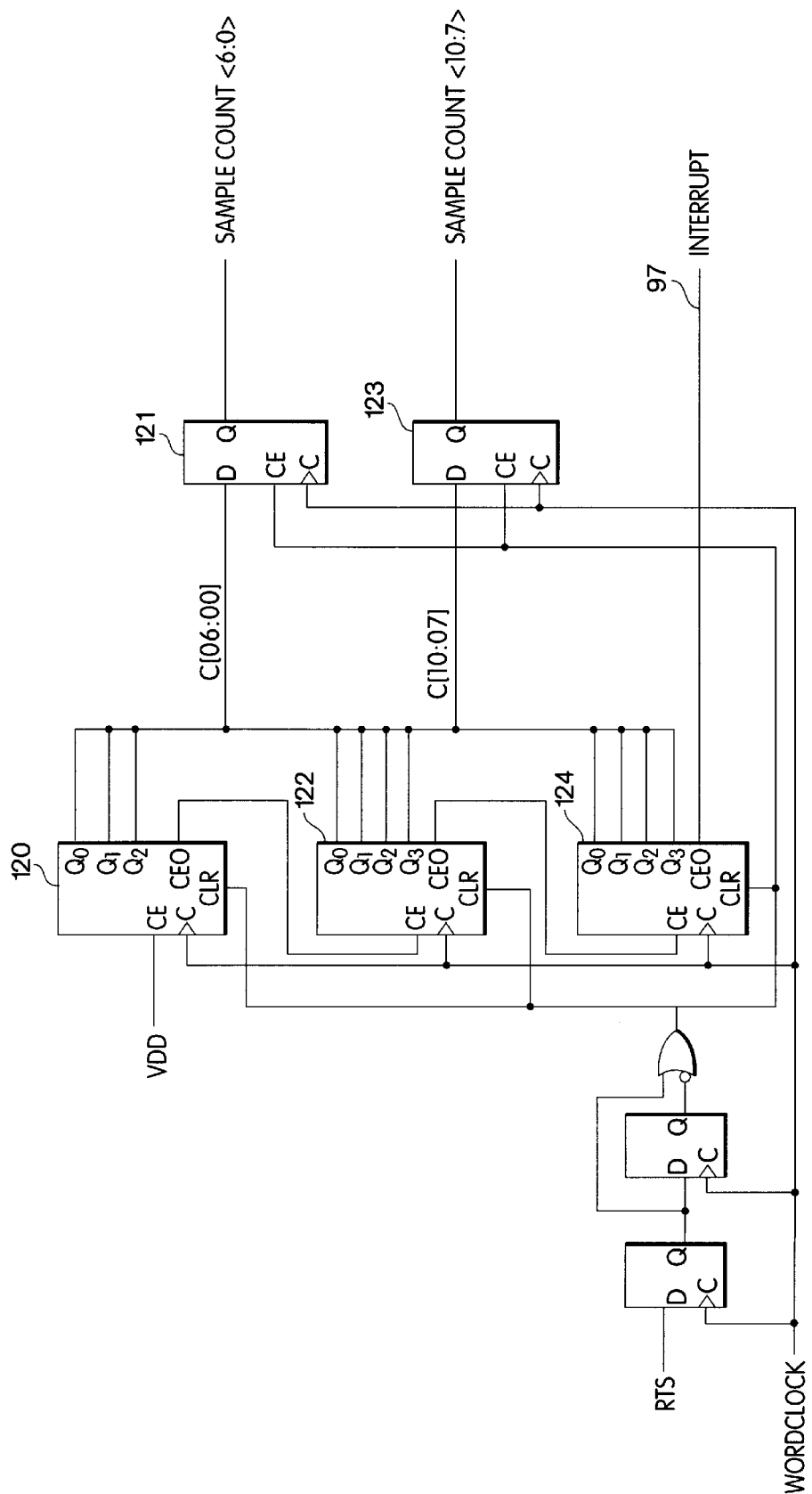
FIG. 4 is a schematic diagram of one embodiment of a sample counter according to the present invention, where the sample counter is located in the FPGA of the universal slave driver as well as in a digital audio workstation (DAW) coupled to the universal slave driver.

Referring now to FIG. 4, a schematic diagram of one embodiment of the sample counter 42 of the present invention is shown. The sample count maintained in the universal slave driver 24 is a 24 bit count. Eleven bits are maintained in hardware and thirteen are maintained in software. The sample counter hardware 42 is shown to include a string of adder circuits 120, 122 and 124, with circuit 120 being a three bit adder, and circuits 122 and 124 being four bit adders. The increment control of each adder circuit is controlled by a combination of the sample clock input and the carry out (CEO) value of the downstream adder circuit. At each assertion of the sample clock, the count value is latched by latches 121 and 123.

When the counter overflows, the Interrupt signal 97 will be asserted to the microprocessor system 50, indicating to the microprocessor 50 to increment the software portion of the count. A leading edge of the RTS signal clears the hardware values in the adder circuits 120–124. The RTS signal is also received by the microprocessor system 46, which clears the software portion of the count.

The contents of the sample counter are output from the FPGA onto the 8 bit data bus coupled to the microcontroller 50. Thus the contents of the sample counter are made available to the microcontroller when required. The feature of being able to read the sample counter, in conjunction with the method used to reset the sample counter, provides a method of triggering with increased accuracy. With these features, an external host computer, such as the digital audio workstation 49, may use the RTS pin of a serial host interface to provide a new functionality of resetting the counter in the universal slave driver.

As described with reference to FIGS. 1 and 1A, the audio card of the digital audio workstation similarly includes a sample counter 44. The sample counter 44 at the DAW is identical in construction to that described in FIG. 4, and is clocked using the sample clock output 97 from the universal slave driver 24. The DAW may then accurately align the two sample counters in the two different devices simply by asserting the RTS line of the host interface. As a result, the overhead delays and inconsistencies formerly incurred during attempts to trigger at a frame edge are eliminated. In addition, the requirement for transmission of actual counts between the slave driver and the DAW is eliminated. Instead, the timers are simultaneously reset to zero by the host DAW. Once the counters are synchronized, they will stay synchronized since they are driven by the same clock.

Figure 5:
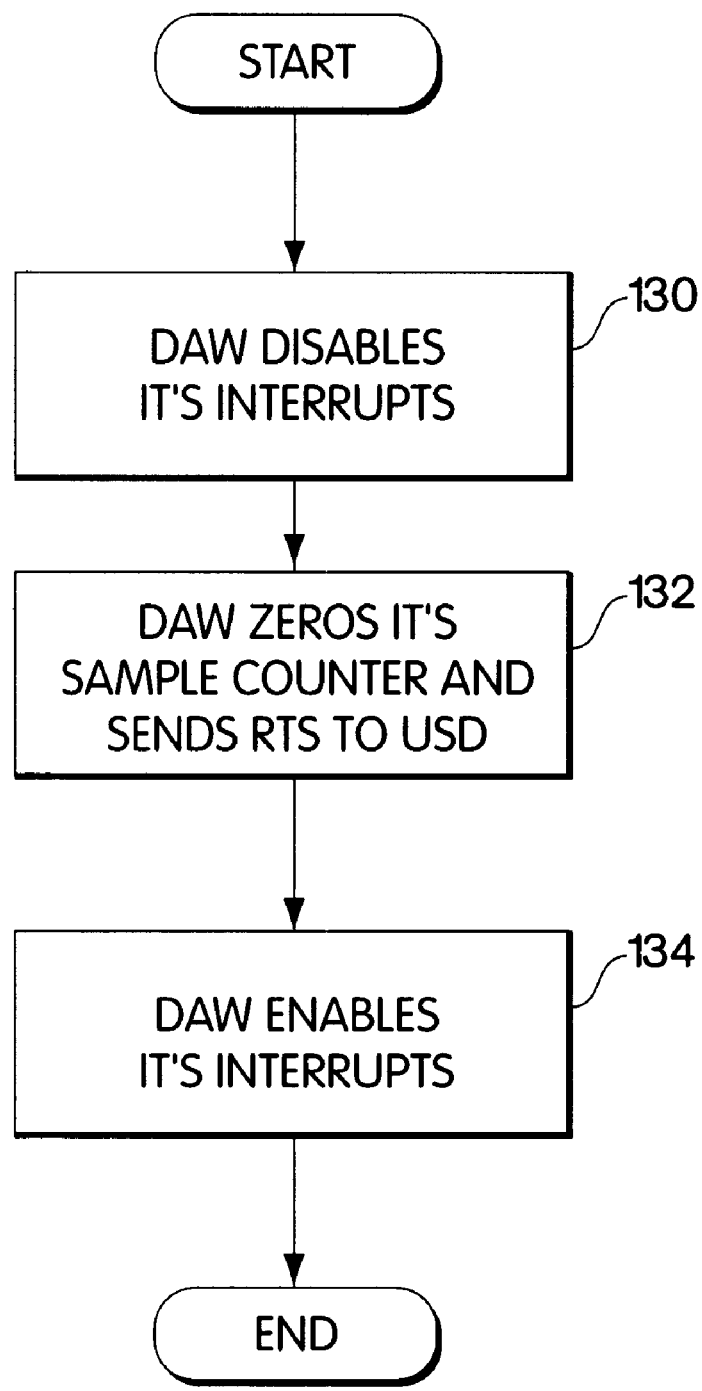
FIG. 5 is a flow diagram illustrating a method used for synchronizing the sample counters in the FPGA and the DAW.

Referring now to FIG. 5, a flow diagram illustrating the method used for resetting the counters at both the slave driver and the DAW is provided. At step 130, the DAW locks out interrupts to ensure unencumbered transmission for the following clock cycles. At step 132, the DAW toggles the RTS line of the serial host port 92. At the DAW, a command is sent to the audio DSP to reset the sample counter. At the slave driver 24, the RTS line is received at the microprocessor, for resetting the software portion of the sample counter, and at the FPGA, where the sample counter 42 is reset. At step 134, the host then restores interrupts. Thus, interrupts are locked out at the DAW only for the amount of time required to zero the DAW's own sample counter and pulse the RTS line.

The sample count is incremented approximately every 20 microseconds. Thus the delay incurred between the initiation of the RTS pulse at the DAW, and the receipt of the leading edge of the pulse at the USD should be less than the increment period of the sample counter. By locking out interrupts during the time period between when the DAW resets the sample counter at the audio card 30 and when the RTS pulse is sent to the USD, the DAW can insure that the RTS pulse will reset the counters in the determined time frame. In one embodiment of the invention, the time delay incurred between when the USD receives the RTS pulse and when the sample counter at the USD is reset is 400 nanoseconds.

Figure 6:
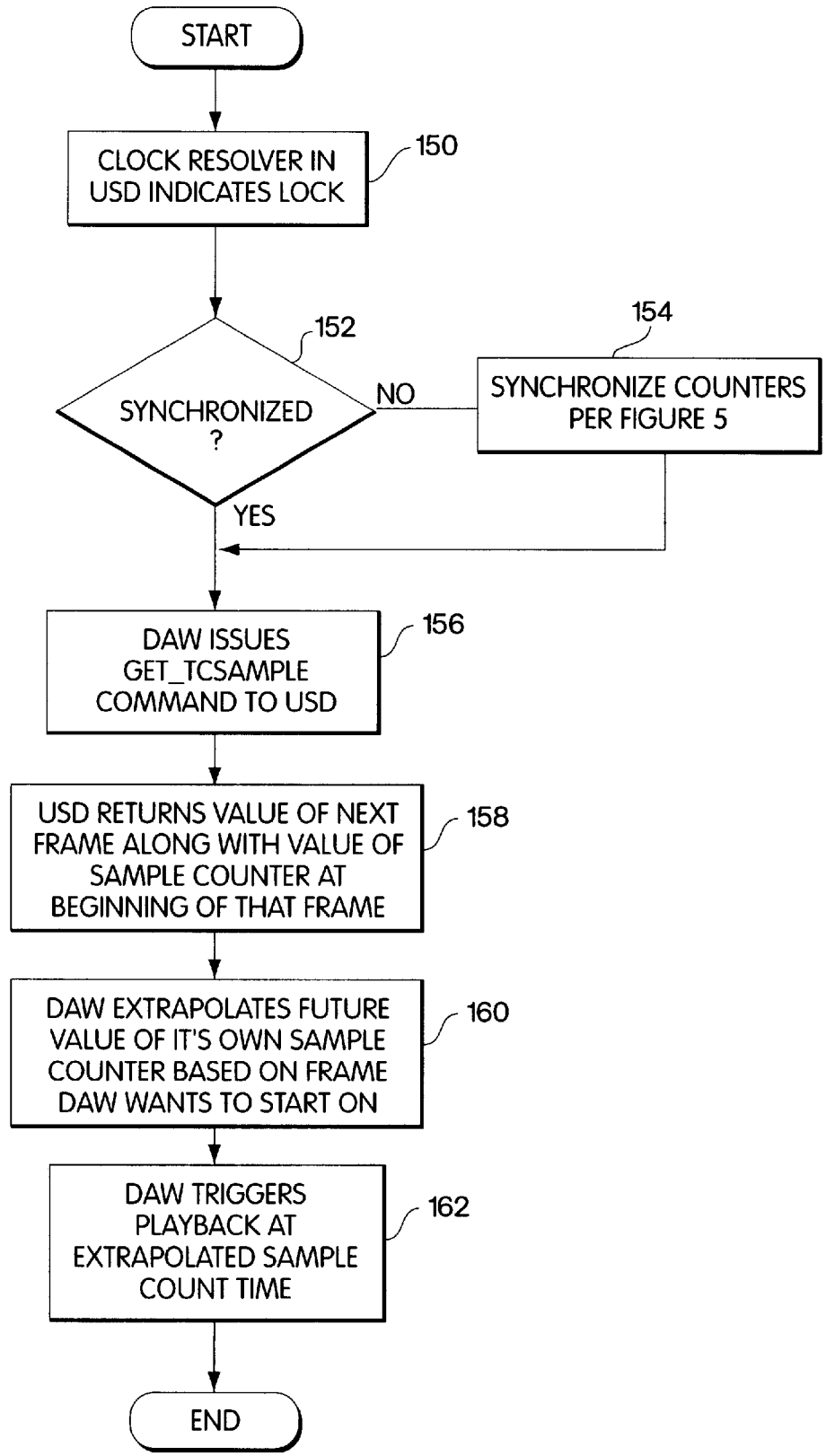
FIG. 6 is a flow diagram illustrating the method used to determine a trigger point at the DAW using the sample counters of FIG. 4.

Referring now to FIG. 6, a flow diagram illustrating the method used to provide accurate triggering with the synchronized sample counters is provided. At step 150, the clock resolver indicates that it has locked to the clock reference, and is sending out the sample clock to the workstation. At step 152, if the sample clocks have not been synchronized, then at step 154 the steps put forth in FIG. 5 are executed. Otherwise, the process proceeds to step 156, where the DAW issues the protocol command GET_TCSAMPLE to the USD over the serial interface. In response to the GET_TCSAMPLE command, at step 158 the USD returns the timecode value of the current frame and the sample counter value at the exact beginning of that frame. At step 160, the DAW computes a future sample counter value based on a desired future timecode value. For example, assume the DAW wants to begin playback at exactly 01:00:05:00 (one hour, zero minutes, five seconds, and zero frames). The DAW issues a GET_TC_SAMPLE command to the USD, and discovers that the current time is 01:00:00:00, and that the sample counter value corresponding to that time is X. Because the DAW knows that there are 1500 samples per frame, and there are 30 frames per second, it can accurately schedule itself to begin playback at a future sample counter value by first finding the difference in frames between the current time (1:00:00:00) and the desired start time (01:00:05:00), multiplying by 30 (since there are 30 frames per second), multiplying by 1500 (1500 samples per frame), and adding X. When the sample counter at the DAW equals the calculated sample count, the DAW triggers playback.

At step 162, the DAW programs the audio board 30 to trigger 1x playback at the computed sample count corresponding to the trigger point. The audio board of the DAW monitors it's sample counter, and begins playback when the counter equals the previously computed sample count.

Thus a method and apparatus for providing high accuracy triggering is provided that avoids the effect of variable delays that can degrade the output image. The use of a sample counter provides an easy method for allowing the DAW to accurately determine and trigger to frame edges. In addition, by using an available host signal, fast synchronization of identical sample counters in two different external devices may be ensured. Once synchronization has been achieved, it is easily maintained, since each of the sample counters is controlled using the same clocking signal.

Host Interface Protocol

The above method and apparatus each provide a mechanism for accurately triggering the sample clocks with minimal communication between the universal slave driver and the DAW. However, according to one aspect of the invention, the values of the sample counters and other time code information may be made available to the DAW via a messaging protocol described below.

As mentioned with regard to FIG. 1, the universal slave driver uses a serial data link 92 for communication with the host DAW. The serial data link is based on RS-232 voltage levels, and operates at a rate between 2400 and 38400 baud. The serial data link is coupled directly to an RS-422 port of the processor 28 of the DAW. As described in detail above, a single handshaking lead, namely the RTS signal, is used for synchronizing sample clock counters located on the universal slave driver and the DAW 29.

Message packets that are transferred between the DAW and the universal slave driver are apportioned into a series of bytes including a preamble, a count, a command ID, and a number of data bytes following the count field of the packet. For example, the message packets may have the below format:

| | |
|---|---|
| Byte 1: | 0x02 //ASCII preamble |
| Byte 2: | 0xXX //Count of Bytes 3 through N inclusive |
| Byte 3: | 0xXX //Command ID |
| . | |
| . | |
| . | |
| Byte N: | 0xXX //Additionally data, if any. |

Replies from the universal slave driver to the DAW echo the command ID, as an aid to parsing. A reply may comprise only a NAK message if the universal slave driver had a problem receiving a packet from the host computer.

For example, the communication protocol for a given command GET_VERSION, where the DAW requests a version number of an application from the universal slave driver, is shown below:

| | | |
|---|---|---|
| Host Sends: | 0x02, | {preamble} |
| | 0x01, | {CNT} |
| | 0x20, | {GET_VERSION command ID} |
| USD replies: | 0x02, | {preamble} |
| | 0x02, | {CNT} |
| | 0x20, | {GET_VERSION command ID} |
| | 0xXX | {version number 0x00 to 0xFF of Application} |

As mentioned above, the USD will forward a NAK response if the command was not received. The NAK response includes a problem classification, indicating the reason for non-receipt of the command. The problem classifications include overrun error at the serial reciever, parity error, message timeout (message not received within 67 ms), received message has zero data length, framing error, or break signal received by the USD.

The packet protocol allows for the DAW to obtain a variety of information from the universal slave driver. Referring now to Table I below, a list of commands/command IDs, their function, and an expected response from the universal slave driver is provided. It should be noted that a 'no return data' in the USD expected response field means that no data is returned, although the command ID is echoed by the USD to acknowledge receipt of the command.

TABLE I

| Command | Function | Expected Response |
|---|---|---|
| GET_VERSION/0x20 | return version # of application | version number |
| GESTALT/0x3D | return features implemented in device | features |

TABLE I-continued

| Command | Function | Expected Response |
|---|---|---|
| SET_SCLK_SRC/0x22 | sets the signal source for the sample clock | no return data |
| SET_SCLK_LIMITS/0x40 | sets bounds of output sample rate | no return data |
| SET_SAMPLERATE/0x23 | sets nominal sample rate at USD | no return data |
| SET_FRAMERATE/0x24 | sets frame rate and counting method | no return data |
| SET_TIMECODE_MODE/0x25 | sets primary mode of timecode system and chooses an input for read mode | no return data |
| SET_LTC_OUT_LEVEL/0x41 | sets the analog output level at the LTC output connector | no return data |
| SET_VIDEO_FORMAT/0x44 | sets format of video signal connected to video in and reference in | no return data |
| SET_TC_OPTIONS0x26 | configures timecode generator | no return data |
| SET_JAM_LENGTH0x3F | controls timecode regenerator, fills timecode where there are dropout, provides timecode when no incoming code available | no return data |
| CONFIG_DUB_WINDOW/0x27 | configures burn-in window | no return data |
| SET_VITC_READ_LINES/0x28 | chooses the VITC line pair to read | no return data |
| SET_VITC_GEN_LINES/0x29 | chooses the VITC line pair to generate | no return data |
| CONFIG_BIPHASE_SIGNALS/0x2A | configures bi-phase reader signals | no return data |
| CONFIG_BIPHASE_PPF/0x2B | configures bi-phase reader pulses per frame | no return data |
| PRESET_TCG/0x2D | presets starting time code for time code generator | no return data |
| SAMPLE_TRIGGER/0x3E | takes action specified after specified sample address is reached | no return data |
| TCGSTOP/OX2E | Stops the timecode generator | no return data |
| TCGRUN/X02F | starts the timecode generator | no return data |
| READ_TC/0X30 | read timecode from timecode generator | source, format, timecode |
| GET_TC_SAMPLE/0X42 | get timecode and associated sample count | status, source, format, timecode, sample count |
| SET_GPI_OUTPUTS | controls the six GPI outputs | no return data |
| GET_GPI_OUTPUTS | reads the state of the output bits | GPI outputs |
| GET_GPI_INPUTS | reads the state of the GPI inputs | GPI inputs |
| SET_VSO | controls variable speed override value | no return data |
| ENABVSO | enables variable speed override | no return data |
| GET_SIGNALS | get signals at respective inputs | signals |
| GET_CONFIGS | return configuration settings | sample clock source, sample rate, frate rate, timecode info, DUB window, etc |
| ALIGN_WORDCLOCK/0x43 | Align USD word clock with leading edge of RTS pulse on next RTS pulse | no return data |
| RTS/RTS signal | RTS modem signal issued to clear sample counters | no return data |
| GET_SC_THISFRAME/0x37 | To align an event in the host computer with a precise timecode reader time | returns sample count of event timecode |
| GET_SC_OFFSET/0x38 | Return sample count between last RTS pulse and Top of Frame | returns 24 bit sample count |
| RS422_WRITE/0x39 | Write from Host port to serial port of USD | no return data |
| RS422_READ/0x3A | Read from Host serial port of USD | returns read data |
| RS422_CONFIG/0x38 | Configures RS422 port | no return data |
| RS422_STATUS/0x3c | Enquire number of bytes in the specified port buffers | number of bytes in buffer |
| REMOTE_MODE/0x21 | Places USD in or out of remote mode. In remote mode, front panel controls are disabled. | no return data |

The set of commands shown above is intended to be illustrative and not restrictive.

The above protocol allows for information and data to be transferred between the USD and DAW in a reliable manner. A number of the commands provided above are particularly useful for communicating time code information between the USD and the DAW. These commands include the RTS command, the GET_TC_SAMPLE command, described above, the GET_SC_THISFRAME command, the ALIGN_WORDCLOCK command and the GET_SC_OFFSET command.

The protocol provided through the use of the host serial interface provides a number of advantages over previous communication methods used in audio-visual editing systems. Historically, a protocol known as Musical Instrument Digital Interface (MIDI) has been used to provide a communication path way between audio instruments and synthesizer tools. The MIDI protocol has also been used to allow manufacturers to communicate information to equipment, when the equipment is coupled with other equipment in a system. The MIDI protocol communicates using message packets and a 7 bit interface. To communicate with a given component using the MIDI protocol, first a packet is issued indicating that the next packet is an exclusive type packet for the specific component. Then the transmission of data bytes is provided over the interface.

The MIDI protocol has several drawbacks in providing a basic communication pathway. First, although the MIDI packets are 8 bits wide, they are broken up into 4 bit halves for transmission over the 7 bit data path. Thus it takes two cycles to provide one byte of data. In addition, transmission cycles are wasted during the setup required to identify a message as 'exclusive'. Thus, for basic communication, there is a loss of efficiency and speed when using the MIDI protocol.

The protocol used in the present invention provides improved performance by providing interface capability using a modem port of the DAW. Because the serial port is dedicated for use between the USD and the DAW, there is no setup time required to identify destination components. In addition, because the serial host interface transfers 8 bits of data each cycle, it provides double the performance available using the MIDI protocol. Also, because it is a dedicated protocol, specific commands may be provided for retrieving time code data and triggering events. By using an existing modem interface of the DAW to the USD, a communication pathway is provided without requiring additional ports at the DAW. In addition, the use of the port allows for the flexibility of allocating a dedicated pin, namely the RTS signal, as a hardwired control for providing synchronization between the DAW and the USD.

The RTS command, as described above, is used to reset and synchronize the sample counters in the USD and the DAW. Because the RTS signal ensures that the two devices are starting from a common reference, the sample count information that is obtained after the RTS signal may be used in a variety of ways to provide accurate samples.

Figure 7:
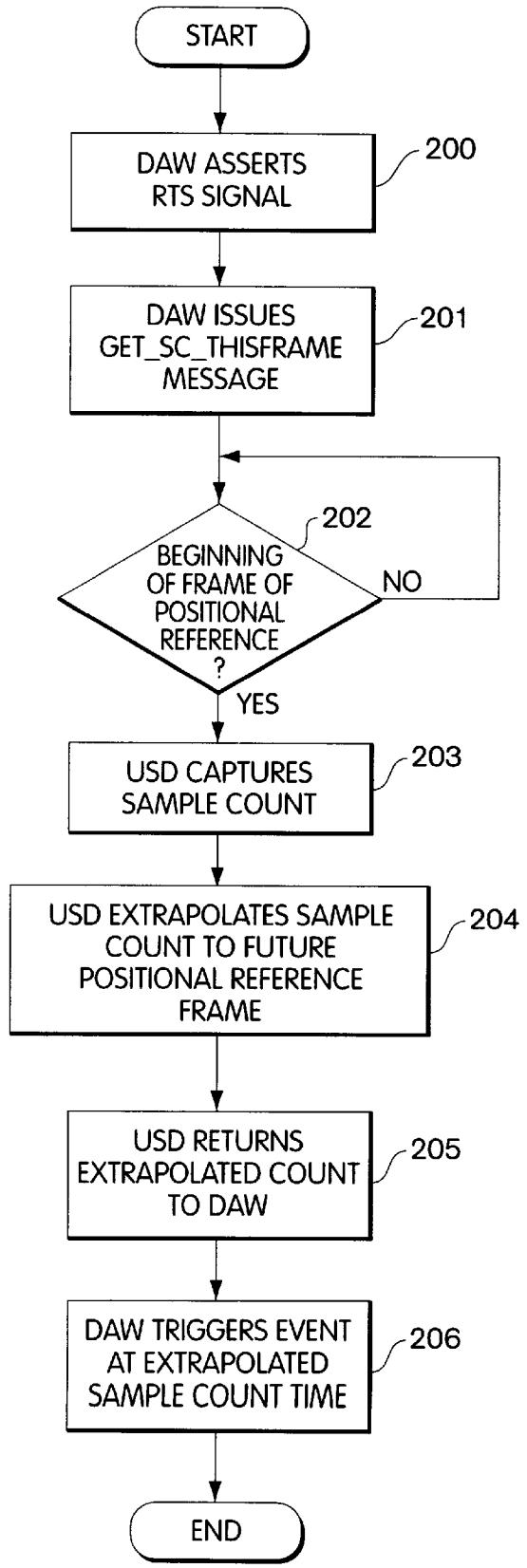
FIG. 7 is a flow diagram illustrating a protocol used for triggering an event at a DAW using the sample counters of FIG. 4.

For example, as described above, the GET_SC_THISFRAME command may be used when it is desired to align an event occurring in the host computer with a precise timecode reader time. One example of such an event would be starting the playback of a sound file. In one embodiment of the invention, the desired timecode reader time can be specified as anything from the current time plus 2 frames out to approximately the current time plus 380 seconds. The 24 bit sample counter 42 (FIG. 1) counts sample clocks, so the specified time frame may occur up to about 0xFFFFF samples in the future. Referring now to FIG. 7, a flow diagram illustrating the operation of the GET_SC_THISFRAME command is provided. At step 200, assuming the sample counters have not already been synchronized, the DAW asserts the RTS signal, causing the sample counters to become synchronized as described in FIG. 5. At step 201, the DAW then forwards the GET_SC_THISFRAME command packet to the USD, where the packet includes a preamble, a command ID and a timecode in format of hours, minutes, seconds, and frames. At step 202, the USD waits for the beginning of the next frame, then at step 203 the USD captures the sample counter value corresponding to the beginning of the frame. At step 204, the USD extrapolates the sample count to determined a future positional reference frame. At step 205, the USD replies to the GET_SC_THISFRAME command packet, with the reply including a preamble, count, command ID, status bits, and the extrapolated future sample count. The status bits indicate whether the USD was able to obtain the sample count information, or whether the USD failed in getting this information, because, for example, the frame has already passed, the timecode is too far in the future, the USD had an internal interrupt, or because the media is not operating up to 1× speed. If a time code was returned, then, at step 206, when the sample counter 44 in the audio board 30 is equal to the sample count forwarded from the USD, the DAW then triggers its event.

Another command that uses the sample count information to obtain positional frame information is the GET_SC_OFFSET command. This command, as described in Table I, returns the amount of misalignment between the USD's 24 bit sample counter and a top-of-frame indication from the timecode generator 48 (FIG. 2). Specifically, it indicates how many audio samples passed from the time the last RTS pulse was received, and the occurrence of the immediately succeeding top-of-frame signal. The GET_SC_OFFSET command thus allows software executing at the DAW to precisely determine where vertical top-of-frame is without requiring specialized hardware in the host and a video reference feed.

Figure 8:
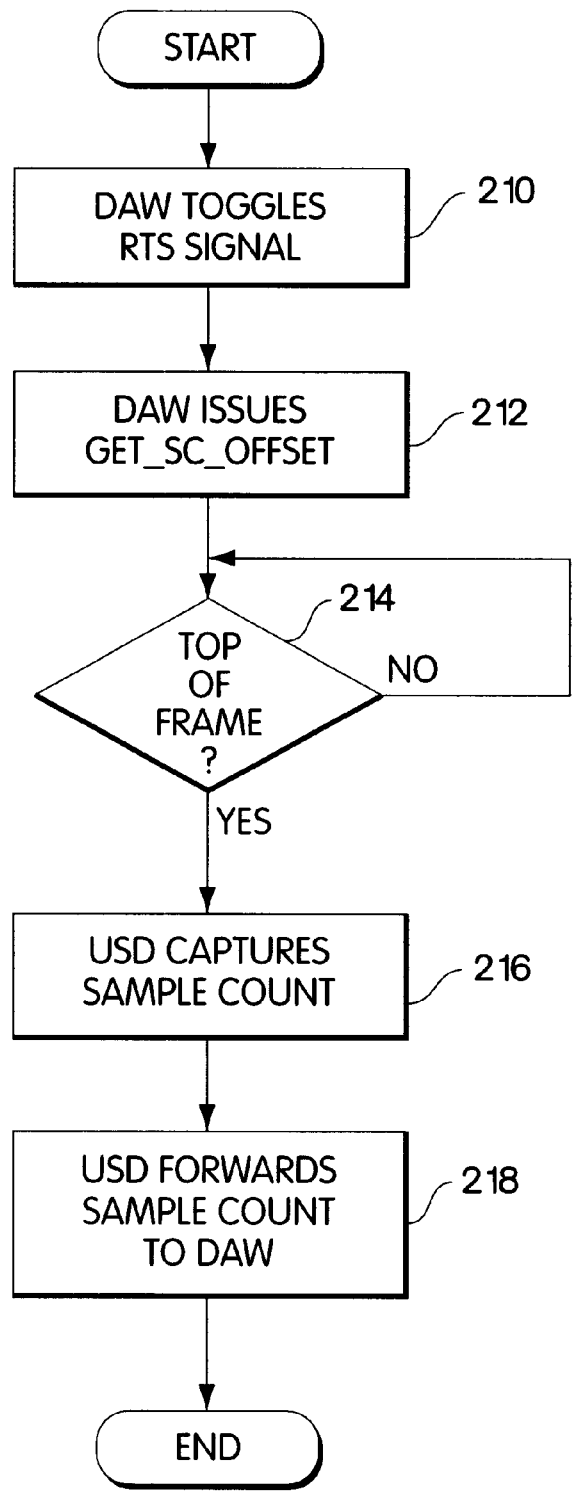
FIG. 8 is a flow diagram illustrating a protocol used for determining the top of a frame at the DAW using the sample counters of FIG.4.

Referring now to FIG. 8, a flow diagram for illustrating the operation of the GET_SC_OFFSET command is provided. At step 210, the DAW toggles the RTS signal to synchronize counters between the USD and the DAW. At step 212, after the counters are synchronized, the DAW issues the GET_SC_OFFSET command over the host serial bus to the USD. The command includes a preamble field, a count field, and a command ID. The USD sample counters have continued counting since the last assertion of the RTS pulse. At step 214, the USD continues counting until a signal 'top_of_frame' is received from the time code receiver and generator 48. When this signal is received, at step 216 the USD captures the sample count. At step 218 the USD replies to the DAW GET_SC_OFFSET by forwarding, over the host serial port 92, a preamble, a count, a command ID, a status indication, and the three bytes of sample count data.

The GET_SC_OFFSET command is used when the DAW is merely interested in determining where the beginning of a frame is, without regard to the timecode value associated with that frame.

Another command that assists the synchronization of the DAW and the USD via the RTS handshaking signal is the command ALIGN_WORDCLOCK. The ALIGN_WORDCLOCK command causes the WordClock output 80 (FIG. 1), to be aligned with the leading edge of the RTS pulse on the next RTS pulse. If subsequent realignments are required, the command must be reissued before the RTS signal is pulsed.

Figure 9:
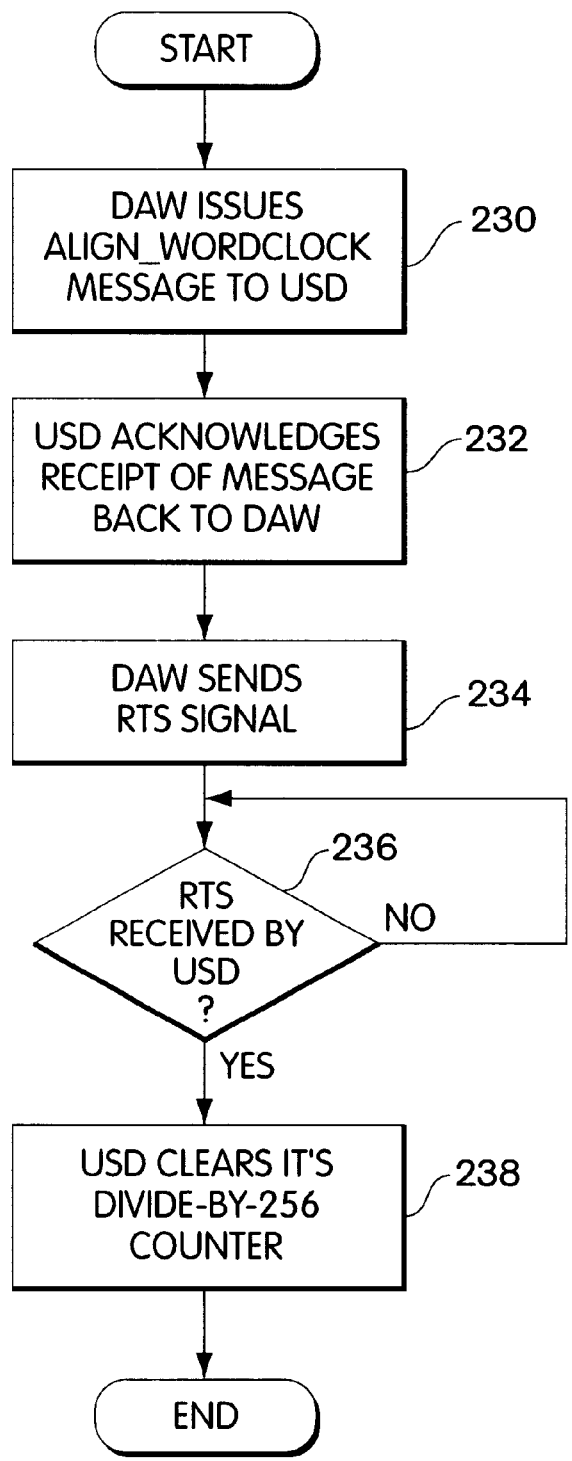
FIG. 9 is a flow diagram illustrating a method for synchronizing word clocks using the RTS signal illustrated in FIG. 1 or FIG. 1A.

Referring now to FIG. 9, a flow diagram illustrating the operation of the ALIGN_WORDCLOCK command is provided. At step 230, the DAW issues the ALIGN_WORDCLOCK command to the USD by forwarding a preamble, count, and associated command ID over the host serial port. The WordClock output is derived from the Superclock counter using an internal divide by 256 counter. Thus the Superclock output operates at 256× the WordClock frequency. At step 232, when the USD receives the ALIGN_WORDCLOCK command, the USD sets an internal software flag and then returns an acknowledgment to the DAW. After receiving the acknowledgment, at step 234 the DAW asserts the RTS sequence as shown in FIG. 5. At step 236, the USD has been waiting for the RTS signal, and when it is received from the DAW, proceeds to step 238, where, if the internal software flag is set, the USD proceeds to clear it's divide-by-256 counter.

The above commands illustrate how triggering information may be transferred between the USD and the DAW to slave the DAW to a future time code provided by the USD. However, the above protocol also provides a command, SAMPLE_TRIGGER that causes the USD to become a slave to the DAW. The SAMPLE_TRIGGER command, issued by the DAW, can be used by the DAW to control the starting and stopping of the time code generator at the USD at a specified sample count. Thus the above protocol provides a method for triggering either the DAW or the USD to specific events.

Thus a slave driver apparatus, coupled between an external device and a digital audio workstation, includes functionality to ensure accurate triggering of frames between the external device and the digital audio workstation. By providing sample counters in both the slave driver and the DAW, synchronization points can be identified easily by synchronizing the counters using a hardwired signal from the host DAW, and computing sample counts for triggering future events. Thus the DAW need only refer to it's own sample counters, and not to any timecode, for calculating a precise point for triggering playback. By providing a hardwired method for determining synchronization points, the uncertainty and delays associated with the prior art software methods are avoided. In addition, a new protocol is provided for transferring timing information between the slave driver and the DAW using a binary host serial interface. By providing timing code information via the host serial interface, time code information may be transferred at a faster rate between the USD and the DAW as opposed to the prior art MIDI protocol. The protocol allows for transfers of sample count information to aid the DAW in properly determining the location of the top-of-frame signal, regardless of whether the DAW receives positional data from the USD or from and external device such as a video tape recorder.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalent thereto.

What is claimed is:

1. An apparatus for synchronizing a picture device and a digital audio workstation, said apparatus and said digital audio workstation both including a counter tracking a medium in said picture device, said apparatus comprising:

a signal line, coupled to said digital audio workstation and coupled to said counters for carrying a signal selectively generated by said digital audio workstation during operation of said digital audio workstation for simultaneously resetting said counters to align said picture device and said digital audio workstation at an identical reference point of said medium.

2. The apparatus according to claim 1, wherein said medium includes a plurality of frames, each frame having associated therewith a start and a time code indicating the position of said frame relative to other frames in the medium, and wherein said first and second counters function to align said picture device and said digital audio workstation at a start of a frame at a predetermined time code.

3. The apparatus according to claim 1, wherein said apparatus further comprises:

an input clock reference port, for receiving a clock reference signal; and a resolver circuit, for providing a sample clock resolved to said reference signal, wherein said counter of said apparatus increments in response to said sample clock.

4. The apparatus according to claim 3, wherein said counter of said digital audio workstation increments in response to said sample clock.

5. The apparatus according to claim 1, wherein said apparatus further comprises:

a host port, for coupling said apparatus to said digital audio workstation, wherein said host port includes a connection for said signal line.

6. The apparatus according to claim 5, wherein said apparatus further comprises:

a controller, coupled to said host port, for receiving packets of information from said digital audio workstation, processing said received packets, and transmitting reply packets to said digital audio workstation.

7. The apparatus according to claim 6, wherein each of said packets transmitted from said digital audio workstation to said apparatus comprises a command field for indicating an operation to be performed at said apparatus.

8. The apparatus according to claim 6, wherein each of said packets transmitted from said digital audio workstation to said apparatus further comprises a count field, for indicating a number of data bytes of said packet.

9. The apparatus according to claim 6, wherein each of said packets transmitted from said digital audio workstation to said apparatus further comprise a preamble field.

10. The apparatus according to claim 6, wherein each of said reply packets further comprises a command field, echoing a command field received from said digital audio workstation.

11. An apparatus for synchronizing a picture device and a digital audio workstation, said picture device and said digital audio workstation both tracking a medium in said picture device, said apparatus comprising:

a first counter for maintaining a first count of sample points of said medium;

a second counter, at said digital audio workstation, for maintaining a second count of sample points of said medium;

a signal line, coupled between said apparatus and said digital audio workstation and coupled to said counters, for carrying a signal, selectively generated by said digital audio workstation during operation of said digital audio workstation, for simultaneously resetting, said counters to align said picture device and said digital audio workstation at a common reference point of said medium.

12. The apparatus according to claim 11, wherein said apparatus further comprises:

an input clock reference port, for receiving a clock reference signal; and a resolver circuit, for providing a sample clock resolved to said reference signal, wherein said counter of said apparatus and said counter of said digital audio workstation both increment in response to said sample clock.

13. The apparatus according to claim 11, wherein said apparatus further comprises:

a host port, for coupling said apparatus to said digital audio workstation, wherein said host port includes a connection for said signal line; and a controller, coupled to said host port, for receiving a packet of information from said digital audio workstation, said received packet having a command field, processing said received packet, and transmitting a reply packet to said digital audio workstation, wherein said reply packet comprises a command field having the value of the command field of the received packet.

14. The apparatus according to claim 13, wherein one of said command fields of said packets comprises a command to retrieve a sample count from said counter of said apparatus.

15. The apparatus according to claim 13, wherein one of said command fields of said packets is a command to retrieve a sample count of an expected event.

16. A method for synchronizing a digital audio workstation to a picture device, said digital audio workstation and said picture device referencing a common medium, the digital audio workstation and picture device coupled via a slave driver device, comprising the step of:

simultaneously resetting a first counter at said slave driver device and a second counter at said digital audio workstation by pulsing a signal coupled between said slave driver device and said digital audio workstation, where said first counter represents a positional reference of said picture device relative to said common medium, and wherein said second counter represents a positional reference of said digital audio workstation relative to said common medium.

17. The method according to claim 16, further comprising the steps of:

issuing, by said digital audio workstation over an interface including said signal, a command to said slave driver device, said first command requesting a value of said counter in said slave driver device; and returning, by said slave driver device, a count value of said counter of said slave driver device.

18. The method according to claim 16, further comprising the steps of:

issuing, by said digital audio workstation over an interface including said signal, a command to said slave driver device requesting a value of said counter at a predetermined timecode; and returning, by said slave driver device, a count value of said counter at said predetermined timecode.

19. The method according to claim 18, further comprising the step of:

monitoring said counter of said digital audio workstation until it is equal to said count value returned by said slave driver device; and triggering, in response to said monitored count being equal to said count value returned by said slave driver device, a predetermined operation at said digital audio workstation.

20. The method according to claim 16, further comprising the steps of:

issuing, by said digital audio workstation over an interface including said signal, a command to said slave driver device instructing said slave driver device to reset an internal clock of said slave driver device on a next assertion of said signal;

asserting said signal; and responsive to said assertion of said signal, resetting said internal clock of said slave driver device and simultaneously resetting an internal clock of said digital audio workstation.

* * * * *